United States Patent
Bastide et al.

(10) Patent No.: US 9,639,625 B1
(45) Date of Patent: May 2, 2017

(54) PRESENTATION OF LINKS TO SOCIAL MEDIA WEBPAGES BASED ON SOCIAL EMINENCE OF POSTER

(71) Applicant: International Business Machines Corporation, Armonk, NY (US)

(72) Inventors: Paul R. Bastide, Boxford, MA (US); Matthew E. Broomhall, Goffstown, NH (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/291,185

(22) Filed: Oct. 12, 2016

(51) Int. Cl.
G06F 7/00 (2006.01)
G06F 17/00 (2006.01)
G06F 17/30 (2006.01)
G06F 3/0482 (2013.01)

(52) U.S. Cl.
CPC ........ *G06F 17/3089* (2013.01); *G06F 3/0482* (2013.01); *G06F 17/3053* (2013.01); *G06F 17/30867* (2013.01); *G06F 17/30873* (2013.01)

(58) Field of Classification Search
CPC ........... G06F 17/30873; G06F 17/3053; G06F 17/30867
See application file for complete search history.

(56) References Cited

U.S. PATENT DOCUMENTS

| | | |
|---|---|---|
| 8,140,579 B2 | 3/2012 | Li et al. |
| 8,312,056 B1 | 11/2012 | Peng et al. |
| 8,402,359 B1 | 3/2013 | Pogodin et al. |
| 9,294,576 B2 | 3/2016 | Lange et al. |
| 2012/0016982 A1 | 1/2012 | Bhatti et al. |
| 2013/0179440 A1 | 7/2013 | Gordon |

OTHER PUBLICATIONS

P. Mell et al., "The NIST Definition of Cloud Computing", National Institute of Standards and Technology, Information Technology Laboratory, Sep. 2011, pp. 1-7.
Anonymous, "Attribution (Marketing)". Wikimedia Foundation, Inc., wikipedia.org, Dec. 18, 2015, WEB. Dec. 22, 2015. <https://en.wikipedia.org/wiki/attribution_marketing>.
mutualmind.com. A Shapiro+Raj Company, 2016. WEB. Dec. 22, 2015. <http://www.mutualmind.com/Products/>.

*Primary Examiner* — Taelor Kim
(74) *Attorney, Agent, or Firm* — Law Office of Jim Boice

(57) ABSTRACT

A method displays links to multiple social media webpages according to social eminences of respective posters of the multiple social media webpages. Navigation paths indicate navigation of web interfaces by one or more viewers that lead to a destination social media webpage on a social media platform. Processor(s) determine a social eminence of each poster of prior webpages and subsequent social media webpages to the destination social media webpage, as well as the quantity of prior webpages and subsequent social media webpages in order to determine a social media webpage ranking of each of multiple social media webpages. Links to the multiple social media webpages in order of their social media webpage rankings are displayed to a user for selection of a particular social media webpage.

20 Claims, 6 Drawing Sheets

PRESENTATION OF LINKS TO SOCIAL MEDIA WEBPAGES BASED ON SOCIAL EMINENCE OF POSTER

BACKGROUND

The present disclosure relates to the field of computers, and particularly to computers that provide and display social media webpages. More particularly, the present disclosure relates to displaying multiple social media webpages according to social eminences of respective posters of the multiple social media webpages.

SUMMARY

In one or more embodiments of the present invention, a method displays links to multiple social media webpages according to social eminences of respective posters of the multiple social media webpages. One or more processors receive, from web interfaces on one or more user computing devices, navigation paths indicating navigation of the web interfaces by one or more viewers of a destination social media webpage on a social media platform. Each navigation path includes: a navigation pathway through one or more prior webpages that were viewed prior to navigating to the destination social media webpage of the social media platform; the destination social media webpage on the social media platform, and a subsequent navigation pathway after the social media webpage that leads to one or more subsequent social media webpages on the social media platform that were viewed after navigating to the destination social media webpage on the social media platform. The processor(s) determine a social eminence of each poster of the one or more prior webpages and the one or more subsequent social media webpages. The processor(s) determine a prior webpages quantity of the one or more prior webpages that were viewed prior to navigating to the destination social media webpage of the social media platform. The processor(s) determine a subsequent social media webpages quantity of the one or more subsequent social media webpages on the social media platform that were viewed after navigating to the destination social media webpage on the social media platform. The processor(s) determine a social media webpage ranking of each of multiple social media webpages according to the social eminence of each poster of the one or more prior webpages and the one or more subsequent social media webpages for each of the multiple social media webpages, the prior webpages quantity for each of the multiple social media webpages, and the subsequent social media webpages quantity for each of the multiple social media webpages. The processor(s) display links to the multiple social media webpages in order of the social media webpage ranking, and then retrieve a particular social media webpage from the multiple social media webpages in response to receiving an input selecting a link to the particular social media webpage.

The described invention may also be implemented in a computer system and/or as a computer program product.

DETAILED DESCRIPTION

Figure 1:
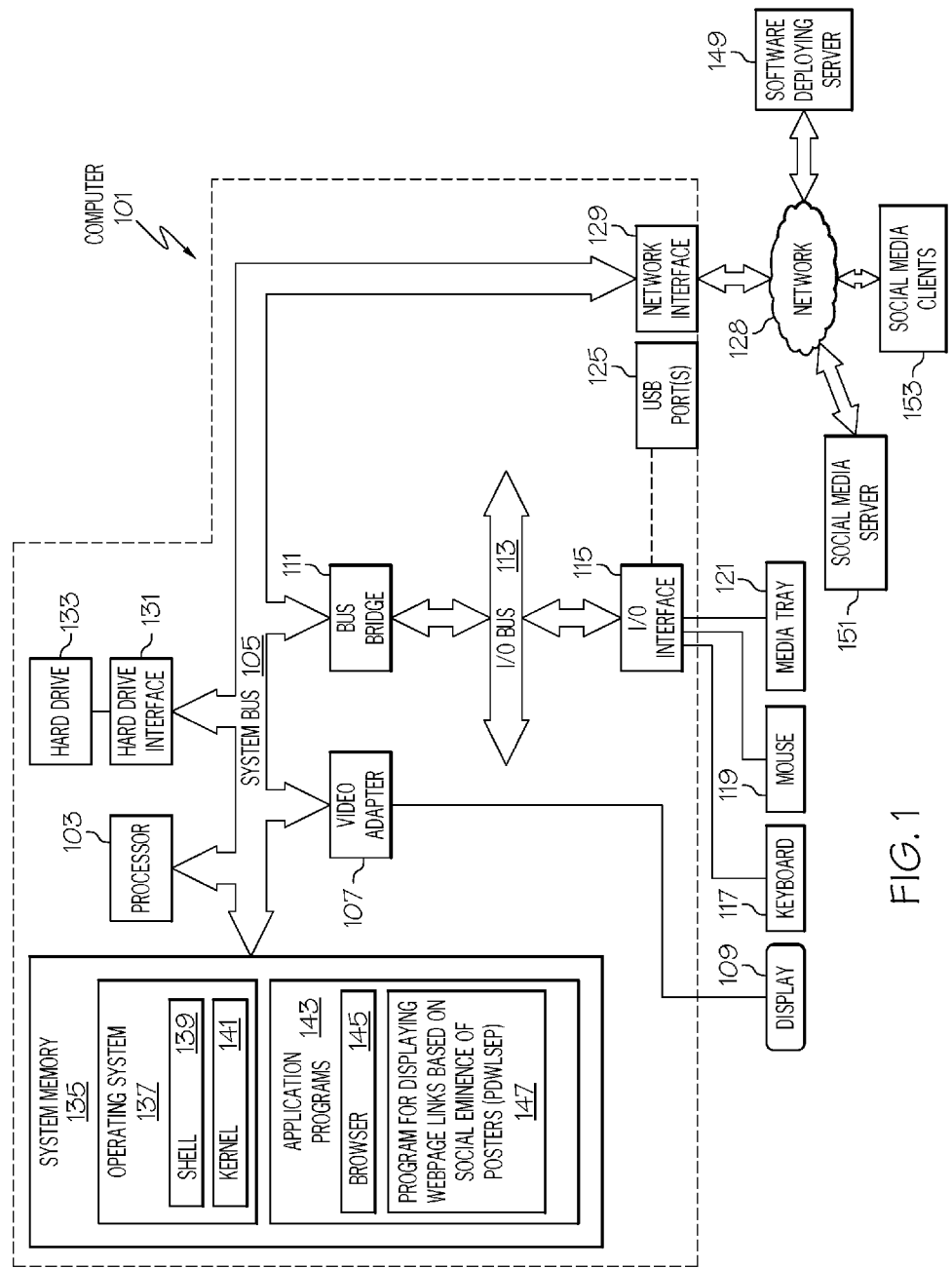
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a social media server 151 and/or social media clients 153 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Displaying Webpage Links based on Social Eminence of Posters (PDWLSEP) 147. PDWLSEP 147 includes code for implementing the processes described below, including those described in FIGS. 2-4. In one embodiment, computer 101 is able to download PDWLSEP 147 from software deploying server 149, including in an on-demand basis, wherein the code in PDWLSEP 147 is not downloaded until needed for execution. In one embodiment of the present invention, software deploying server 149 performs all of the functions associated with the present invention (including execution of PDWLSEP 147), thus freeing computer 101 from having to use its own internal computing resources to execute PDWLSEP 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Mail clients and online social networks are mechanisms to connect people and information in logical and organized ways, which enable sharing and processing of information between the users. On social media postings, mechanisms of sharing and processing information may include an inbox (for mail), a wall (of responsive comments), activity stream (of activities), timeline (of postings) and/or a profile (of posters). These mechanisms enable one to rapidly share information with others and gather information from others in the networks.

However, social media users create, read and respond to countless messages each day. Due to their high volume, messages are often missed, ignored or processed without a useful priority.

One way of determining the significance of a social media posting is based on the quantity of persons who acknowledge the social media posting, by indicating that they have read the social media posting with a "Like" (a short positive review, often indicated by clicking an icon, emoji, etc.).

However, certain social media postings are also important, even if read by a smaller audience, based on the social eminence of the poster. That is, a celebrity who posts a social media posting that is read by one million viewers has a de facto social eminence (e.g., a high level of fame, influence, trust, reputation, etc.) based on the celebrity's popularity. However, a non-celebrity who posts a social media posting may also have a certain level of social eminence, even though only a few persons may read that non-celebrity's posting. That is, certain posters/authors of social media content have high levels of social eminence based on their reputation, their body of work, how many people cite them in other webpages, etc.

In order to address this issue, one or more embodiments of the present invention present a process for determining the social eminence of posters/authors of various social media postings based on factors instead of and/or beyond the number of viewings of their posts, and then ranking and displaying various social media postings according to the social eminence of their posters.

As described herein, one or more embodiments of the present invention calculate a poster/author's real social eminence by: observing the incoming path/outgoing path to a posting by the poster; analyzing and determining the impact for each path through/to the posting; calculating the attribution of the posting; and presenting to a user the impact of the message. This enables the present invention to calculate the impact of all of the postings from the poster or a subset of postings from the poster.

As described herein, the present invention focuses on the actual use of the posting in order to determine the actual eminence of a poster over the set of navigation paths. Various embodiments of the present invention focus on how a person's post is used and how the posting is found by other user(s) by focusing on the navigation paths to arrive at the posting, and then aggregating the data to determine the poster's full influence. This leads to the use of the concept of referrers, the prior element in a history and the next step to determine the impact and eminence generated in a navigation path. Thus, the navigation paths provide a determination of a poster's actual eminence based on the aggregated navigation paths.

Figure 2:
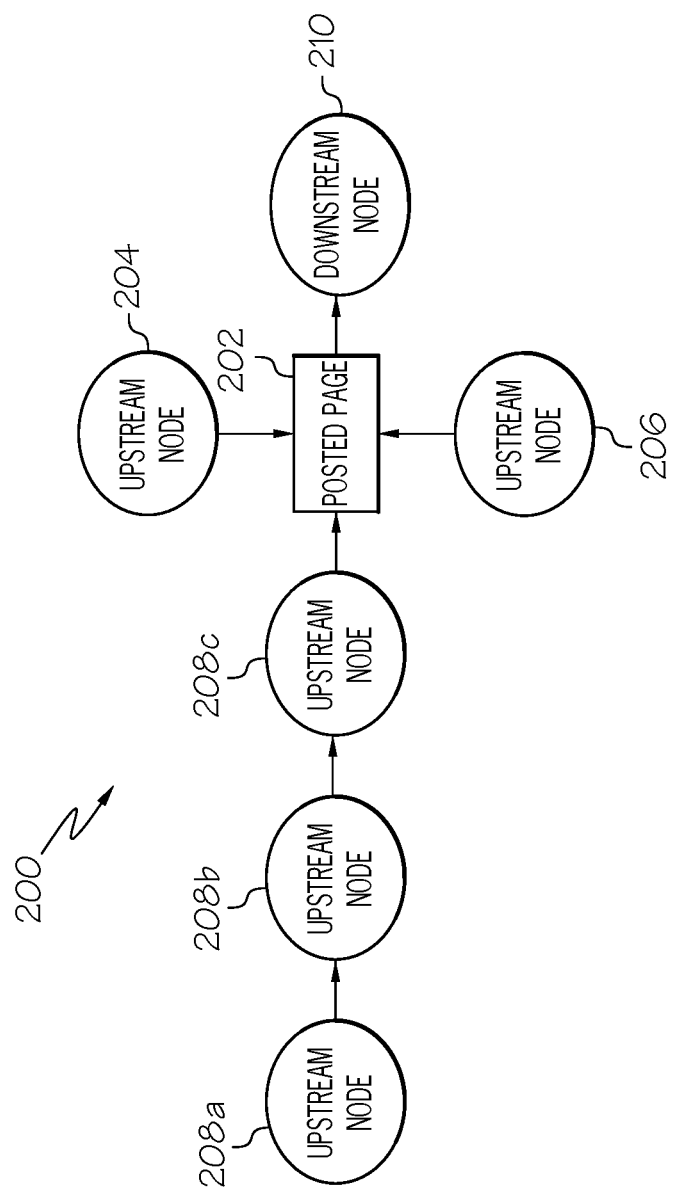
FIG. 2 illustrates an exemplary pathway to and from a destination social media webpage.

With reference now to FIG. 2, an exemplary navigation path 200 to and from a destination social media webpage, depicted as posted page 202, is presented. Posted page 202 is described herein as a "destination social media webpage" since in one or more embodiments it is a webpage on a social media platform that has been reached by traversing through various upstream nodes by one or more users. These upstream nodes (e.g., upstream node 204, upstream node 206, and/or upstream nodes 208a-208c) are prior webpages that have been navigated through to reach the posted page 202.

For example, assume that upstream node 204 is a website that a user has found using a search engine. Assume now that on that website there is a link (e.g., a hyperlink) to the posted page 202 that, if clicked, will take the user to the posted page 202. Similarly, upstream node 206 may also be a website that has a hyperlink to the posted page 202. Assume further that the users of upstream node 204 and/or upstream node 206 stop at posted page 202. That is, rather than start a new web search for information related to that found in posted page 202, the users of upstream node 204 and/or upstream node 206 have found the information they are looking for, thus indicating that the person who posted the posted page 202 is knowledgeable in this area, and thus has the "social eminence" of having such knowledge.

Assume now that another user clicks through various nodes (upstream nodes 208a-208c) until he/she gets the information that he/she is looking for. For example, assume that the user is looking for an answer to "How to I deploy XYZ to the Cloud?". The answer to this question was not found in upstream nodes 208a-208c. Rather, upstream node 208a contains a link to upstream node 208b (another webpage) and suggests that the answer may be found on upstream node 208b. Similarly, upstream node 208b contains a link to upstream node 208c (another webpage) and suggests that the answer may be found on upstream node 208c. None of upstream nodes 208a-208c contain the answer to the question "How to I deploy XYZ to the Cloud?". However, upstream node 208c contains a suggested link to posted page 202, which in fact has the information that the user needs to answer the question "How to I deploy XYZ to the Cloud?".

Thus, if a user must traverse many nodes (e.g., upstream nodes 208a-208c) in order to arrive at the posted page 202 that has the needed information, then the significance of posted page 202 is high, since it has information that was not found in any of the upstream nodes 208a-208c. This leads to the conclusion that the author/poster of posted page 202 is one who has a high level of expertise in deploying content to the Cloud, and thus that author/poster has a high level of social eminence (e.g., expertise, as well as fame, respect, etc.).

The value of the posted page 202 (and thus the social eminence of the author/poster of the posted page 202) can also be ascertained by who "pulls" content from the posted page 202. That is, the importance of the posted page 202 may be based on how arduous it is for an upstream user to arrive at the posted page 202, as just described. However, the value of the posted page 202 can also be based on the "followers" of the posted page 202. That is, assume that a user of downstream node 210 has elected (e.g., via a pub/sub service, a "follower" service, etc.) to receive posted page 202 whenever downstream node 210 turns on, whenever downstream node 210 connects to a network, whenever there is a change to posted page 202, etc. If posted page 202 is viewed/followed by a person with a high social eminence (e.g., an expert in a particular field, a celebrity, etc.), then this will raise the importance of the posted page 202 and thus the social eminence of the author/poster of the posted page 202. The identity of the person who is using the downstream node 210 (e.g., a webpage on a computer) can be determined by matching that computer to that person.

Figure 3:
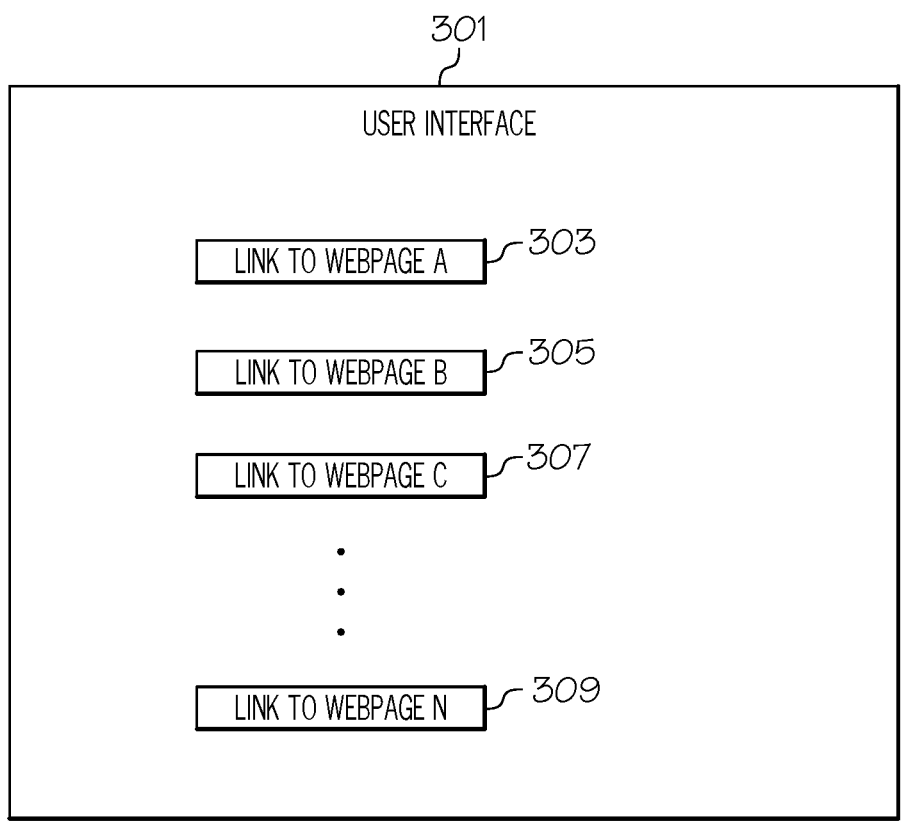
FIG. 3 depicts a user interface displaying multiple social media webpages being displayed according to their social media webpage ranking.

With regard now to FIG. 3, assume that multiple post pages (posted page 202 shown in FIG. 2 as well as other posted pages that have been evaluated in a manner as described in FIG. 2) have now received social media website rankings, based on the social eminence of their respective authors/posters. As shown in FIG. 3, a user interface 301 (e.g., on a display such as display 109 when incorporated into one or more of the social media clients 153 shown in FIG. 1) displays multiple social media webpages according to their social media webpage ranking. For example, assume that there are "n" (where "n" is an integer) webpages, each of which has been evaluated according to the social eminence of the person who authored/posted each of these webpages (where each of the webpages is analogous to the posted page 202 shown in FIG. 2).

As shown in FIG. 3, links 303-309 are displayed on user interface 301, and clicking link 303 will take a user to webpage A, clicking link 305 will take a user to webpage B, clicking link 307 will take a user to webpage C, and clicking link 309 will take a user to webpage N. Assume now that webpage A has the highest rating (based on the social eminence of its author/poster) of all of the depicted webpages. As such, link 303 is displayed at the top of the links 303-309. The links are then displayed in descending order, such that link 309 for the lowest rated webpage N is displayed at the bottom of the display.

In accordance with one or more embodiments, the present invention may be used with collaboration systems, project management and social systems, such as Question/Answering Systems (websites devoted to users willing to answer online questions from persons), Social Networking, Asynchronous Networks—(e.g., systems that allow persons to "follow" certain content posters), Synchronous Networks (e.g., text messaging systems), Email networks, Instant Messaging systems, Chat Room messaging systems, Wiki systems, (user information sharing systems), Systems devoted to particular projects, products, etc. That is, the present invention utilizes data from such collaboration systems in one or more embodiments.

Observing the Incoming Path/Outgoing Path to the Message (e.g., posted page 202 shown in FIG. 2) may be achieved by a system (e.g., computer 101 and/or social media server 151 shown in FIG. 1) tracking network navigations by systems such as the social media clients 153 shown in FIG. 1.

This tracking (e.g., by monitoring a browser history, etc.) records the following interactions with the message: Navigation—incoming (referrers) and outgoing (clicks/links) according to a past navigation history; Terminal interactions (e.g., determining that the posted page 202 is the terminal webpage based on certain terms from the viewer such as "Thanks for the help! This is what I needed!") or a lack of subsequent connections to other webpages, etc.; Social Metadata in which a recommendation, comment, upvote, share/reshare is provided by the viewer of the message, etc.

A Likelihood of Relationships between different nodes can be ascertained by graph-based predictions regarding the eminence of the poster/page, as described above.

The Attribution of the page can be made by explicit references (e.g., reply, forward, social metadata (like, comment, share), etc.); implicit references (e.g., search terms, posted content with similar language, etc.) a record of the amount of content from the page that is leveraged/copied/pasted; embedded content in the page; etc.

Based on this information, the position/placement on a list is determined (see FIG. 3).

In one or more embodiments, the present invention records a time-action-link (e.g., in a message id for a posting such as the posted page 202). If no further related action is found on a PATH, the invention may mark the link/node as TERMINAL. If at the start of a PATH, the invention may record START. The START is determined based on login, activity after a period of inactivity, or other items.

The invention may share the path between applications in different computers via a shared URL/window message. The invention may also incorporate user identified elements (e.g., node identifiers) into the path.

The invention may work with specific types of messages, such as one-to-one, one-to-many, public, private, organization specific, etc., as well as sets of messages, conversations or a single message.

Analyzing and determining the impact for each path through/to the message is achieved by retrieving all the messages related to the current message. That is, in one or more embodiments the present invention recursively retrieves all the messages related to the paths, although the number of recursions may be limited. Similarly, the use of social metadata may be limited in order to speed processing.

Furthermore, the present invention may be restricted to certain original sources of the path.

Calculating the attribution of the message includes scoring each of the interactions according to a percentage of usage for attribution, other counts, etc. The score may use separate incoming versus outgoing calculations.

In one or more embodiments, the present invention requires a minimum level of activity (e.g., more than 10 "hits" on a particular posting) before generating/presenting a score in order to rank/present links to that particular posting as described herein.

The present invention may use a dynamic programming technique to reduce subsequent calculations, in order to smooth the calculation using a default minimum value for every interaction. Such smoothing may also be enabled using relative weighting of the page scores.

Figure 4:
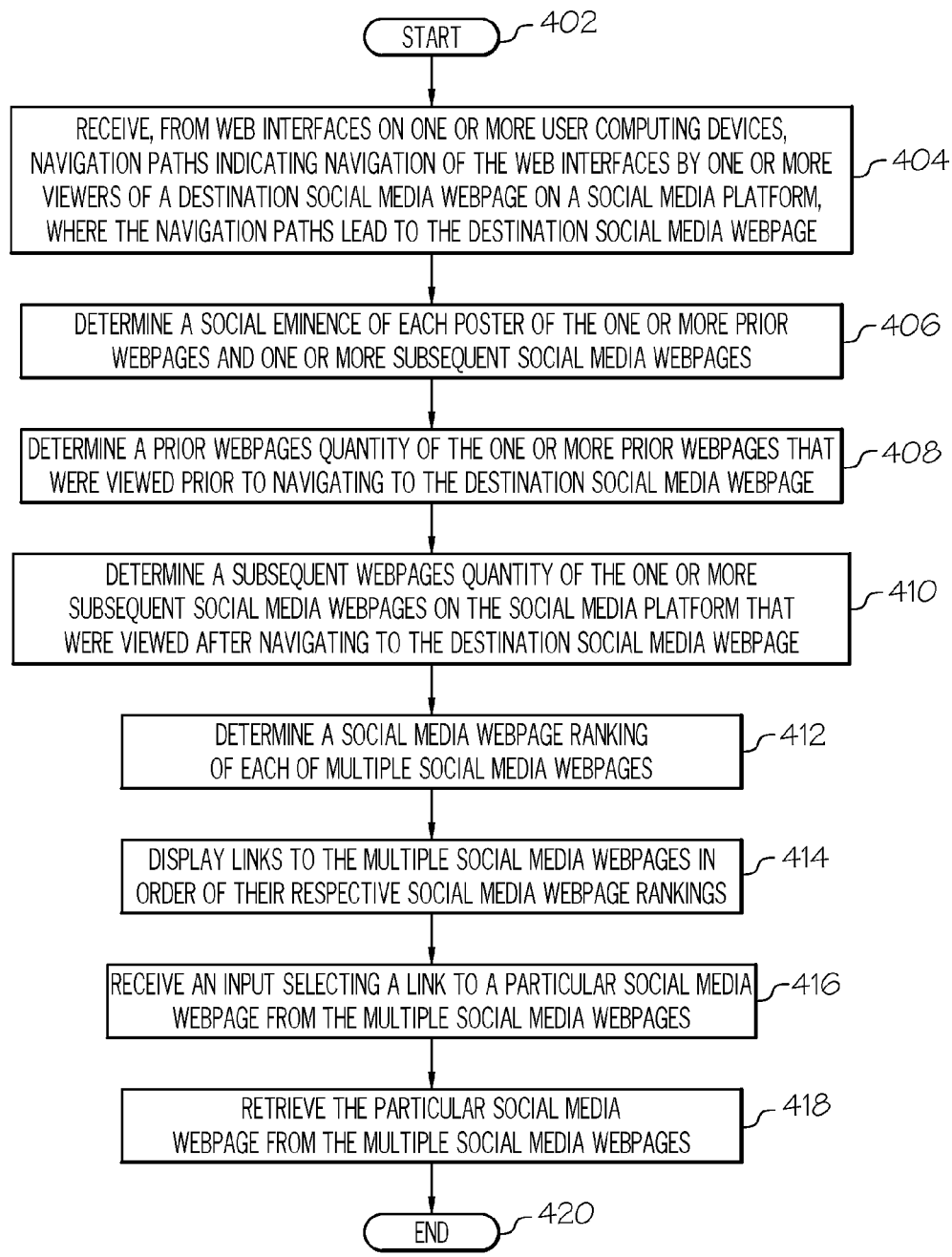
FIG. 4 is a high level flow chart of one or more steps performed by one or more processors and/or other hardware devices to display multiple social media webpages according to social eminences of respective posters of the multiple social media webpages in accordance with one or more embodiments of the present invention.

With reference now to FIG. 4, a high level flow chart of one or more steps performed by one or more processors and/or other hardware devices to display multiple social media webpages according to social eminences of respective posters of the multiple social media webpages in accordance with one or more embodiments of the present invention is presented.

After initiator block 402, one or more processors (e.g., processor 103 found in computer 101 and/or social media server 151 shown in FIG. 1) receive from web interfaces on one or more user computing devices (e.g., one or more of the social media clients 153 shown in FIG. 1), navigation paths indicating navigation of the web interfaces by one or more viewers of a destination social media webpage on a social media platform, where the navigation paths lead to the destination social media webpage, as described in block 404. That is, the processors look at the navigation path taken to reach the destination social media webpage (e.g., posted page 202 shown in FIG. 2).

In one or more embodiments of the present invention, each navigation path includes: a navigation pathway through one or more prior webpages (e.g., the navigation pathway through upstream nodes 208a-208c shown in FIG. 2) that were viewed prior to navigating to the destination social media webpage of the social media platform; the destination social media webpage (e.g., posted page 202) on the social media platform; and a subsequent navigation pathway (e.g., the pathway to downstream node 210 shown in FIG. 2) after the social media webpage that leads to one or more subsequent social media webpages on the social media platform that were viewed after navigating to the destination social media webpage on the social media platform.

As described in block 406 in FIG. 4, the processor(s) determine a social eminence of each poster of the one or more prior webpages and the one or more subsequent social media webpages. This social eminence may be based on these content poster's (i.e., persons who posted the prior webpages) on-line popularity (e.g., how many "followers" they have online), the poster's professional reputation (e.g., as established by crawling the World Wide Web to identify how many publications have been filed by the content poster and responses (e.g., "likes", being referenced by other publications, etc.) thereto), the rankings of other pages posted by the content poster (such as posted page 202) in accordance with the ranking process described herein, etc.

As described in block 408 in FIG. 4, the processor(s) determine a prior webpages quantity of the one or more prior webpages that were viewed prior to navigating to the destination social media webpage of the social media platform (e.g., "three" for upstream nodes 208a-208c shown in FIG. 3).

As described in block 410 in FIG. 4, the processor(s) determine a subsequent social media webpages quantity (e.g., "one" for downstream node 210) of the one or more subsequent social media webpages on the social media platform that were viewed after navigating to the destination social media webpage on the social media platform.

As described in block 412 in FIG. 4, the processor(s) determine a social media webpage ranking of each of multiple social media webpages according to the social eminence of each poster of the one or more prior webpages and the one or more subsequent social media webpages for each of the multiple social media webpages, the prior webpages quantity for each of the multiple social media webpages, and the subsequent social media webpages quantity for each of the multiple social media webpages. For example, as shown in FIG. 3, "webpage A" is the highest ranked social media webpage from webpages A-N.

As described in block 414 in FIG. 4, the processor(s) then display links to the multiple social media webpages in order of the social media webpage ranking (see FIG. 3). For example, when the processor(s) receive a request/query regarding the subject matter of the multiple social media webpages, the ranked links to the multiple social media webpages are returned.

As described in block 416 in FIG. 4, the processor(s) receive an input selecting a link (e.g., link 303) to a particular social media webpage (e.g., "webpage A") from the multiple social media webpages.

As described in block 418 in FIG. 4, the processor(s) then retrieve the particular social media webpage from the multiple social media webpages in response to receiving the input selecting the link to the particular social media webpage and present it to the user.

The flow-chart ends at terminator block 420.

In one or more embodiments of the present invention, a higher prior webpages quantity leads to a higher social webpage media ranking for a particular social media webpage from the multiple social media webpages, and the higher prior webpages quantity comes from a single navigation path to the particular social media webpage for a single user. That is, the more upstream nodes (e.g., upstream nodes 208a-208c) from a single path that are required to reach the particular social media webpage (e.g., posted page 202), the higher ranked the particular social media webpage.

In one or more embodiments of the present invention, a higher prior webpages quantity leads to a higher social media webpage ranking for a particular social media webpage from the multiple social media webpages, and the higher prior webpages quantity comes from multiple navigation paths to the particular social media webpage for multiple users. That is, the total number of nodes, from singular node pathways (e.g., those followed going to posted page 202 from upstream node 204 and upstream node 206) as well as multi-node pathways (e.g., that followed by upstream nodes 208a-208c) to reach the particular social media webpage (e.g., posted page 202), the higher ranked the particular social media webpage.

In one or more embodiments of the present invention, a lower subsequent social media webpages quantity leads to a lower social webpage media ranking for a particular social media webpage from the multiple social media webpages. That is, if downstream node 210 does not follow/subscribe to the information/link for posted page 202, then that indicates that the posted page 202 is not very important/useful. However, if downstream node 210 "follows" the information/link for posted page 202, (and/or if many other downstream nodes are "following" posted page 202) then that indicates that the posted page 202 is very important/useful.

In one or more embodiments of the present invention, the processor(s) assign a lowest available social media webpage ranking to a particular social media webpage from the multiple social media webpages that has a combined social eminence score of all posters of the one or more prior webpages and the one or more subsequent social media webpages that falls below a predefined value. That is, if all of the posters of the upstream nodes 204, 206, 208a-208c as well as the downstream node 210 shown in FIG. 2 have social eminence scores that, when combined, fall below some predefined value (e.g., due to these posters/authors lack of publication presence on the Web, lack of fame, lack of "followers", etc.), then the posted page is ranked at the bottom of the list (e.g., "webpage N" shown in FIG. 3).

In an embodiment of the present invention, the processor(s) assign a lowest available social media webpage ranking to any of the multiple social media webpages that has a prior webpages quantity that is below a predefined value. For example, any social media webpage that has less than three upstream nodes (e.g., has only upstream nodes 204 and 206 shown in FIG. 2) will automatically be assigned a lowest possible ranking.

In an embodiment of the present invention, the processor(s) assign a lowest available social media webpage ranking to any of the multiple social media webpages that has a subsequent social media webpages quantity that is below a predefined value. For example, if there is only a single downstream node 210 following the posted page 202 shown in FIG. 2 for a particular page/webpage, then that page/webpage may be assigned the lowest possible ranking.

In one or more embodiments of the present invention, the one or more prior webpages (e.g., upstream nodes 204, 206, 208a-208c shown in FIG. 2) are all social media webpages, just like posted page 202.

However, in another embodiment of the present invention, none of the one or more prior webpages were social media webpages (e.g., they are web logs (blogs), emails, etc.).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
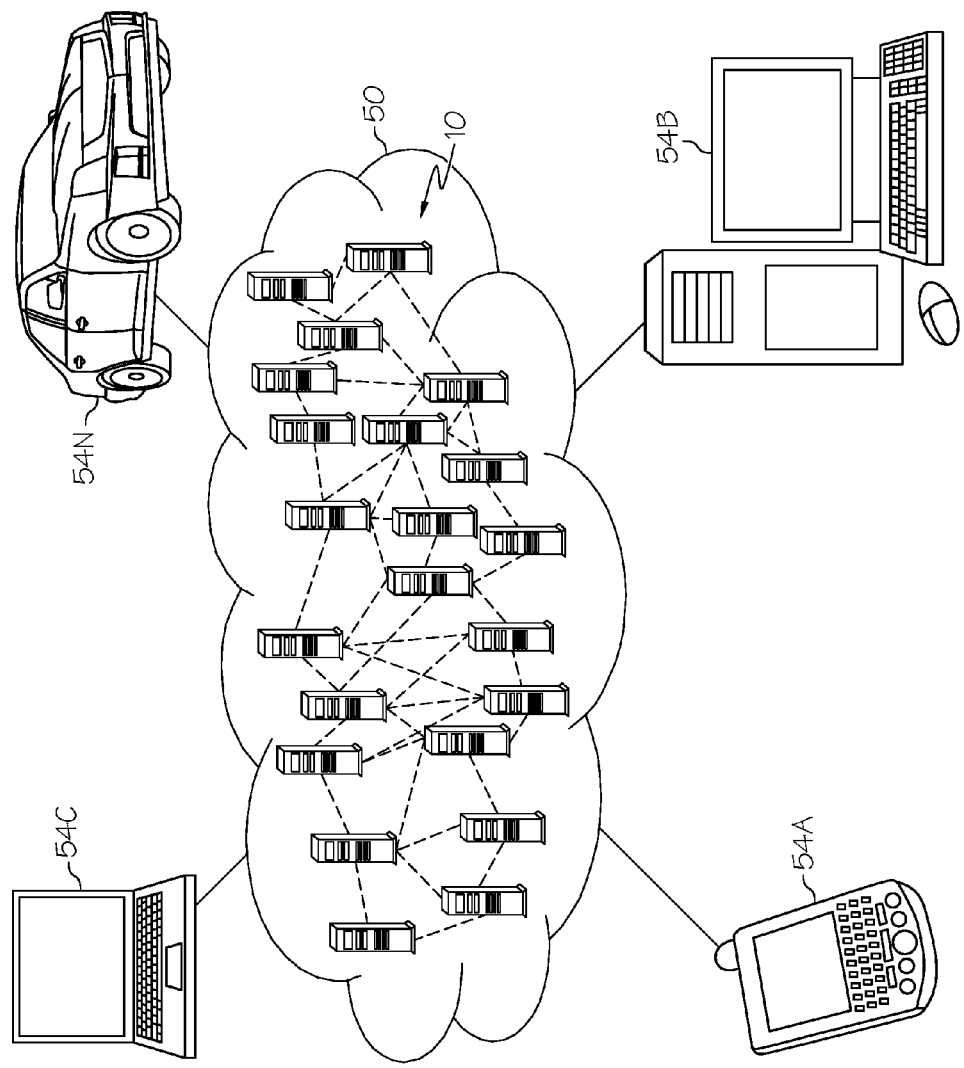
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
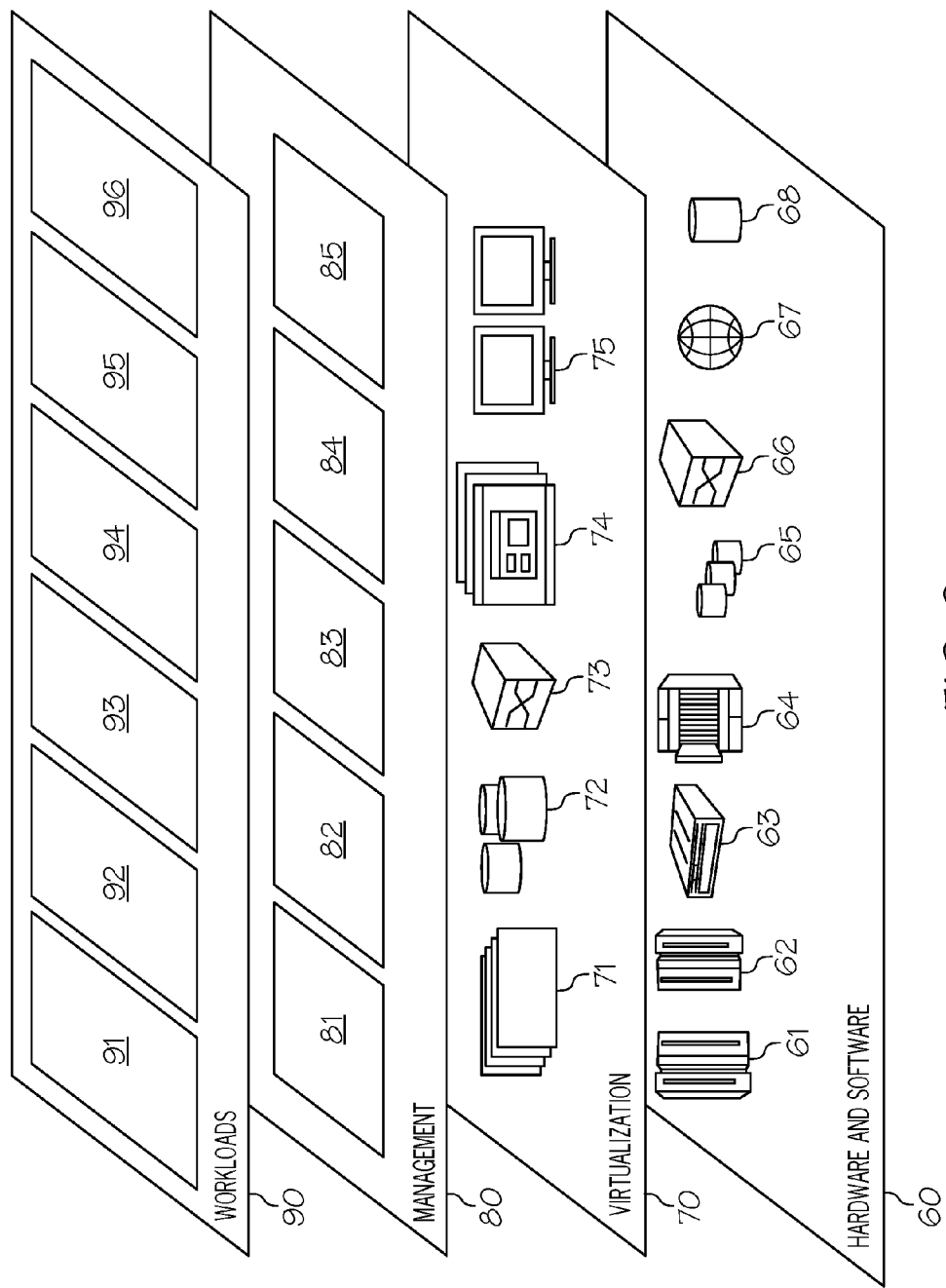
FIG. 6 depicts abstraction model layers of a cloud computer environment according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and eminence-based content display processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of displaying links to multiple social media webpages according to social eminences of respective posters of the multiple social media webpages, the computer-implemented method comprising:
   receiving, by one or more processors and from web interfaces on one or more user computing devices, navigation paths indicating navigation of the web interfaces by one or more viewers of a destination social media webpage on a social media platform, wherein the navigation paths lead to the destination social media webpage, and wherein each navigation path includes;
   a navigation pathway through one or more prior webpages that were viewed prior to navigating to the destination social media webpage of the social media platform, the destination social media webpage on the social media platform, and a subsequent navigation pathway after the social media webpage that leads to one or more subsequent social media webpages on the social media platform that were viewed after navigating to the destination social media webpage on the social media platform;

determining, by one or more processors, a social eminence of each poster of the one or more prior webpages and the one or more subsequent social media webpages;

determining, by one or more processors, a prior webpages quantity of the one or more prior webpages that were viewed prior to navigating to the destination social media webpage of the social media platform;

determining, by one or more processors, a subsequent social media webpages quantity of the one or more subsequent social media webpages on the social media platform that were viewed after navigating to the destination social media webpage on the social media platform;

determining, by one or more processors, a social media webpage ranking of each of multiple social media webpages according to the social eminence of each poster of the one or more prior webpages and the one or more subsequent social media webpages for each of the multiple social media webpages, the prior webpages quantity for each of the multiple social media webpages, and the subsequent social media webpages quantity for each of the multiple social media webpages;

displaying, by one or more processors, links to the multiple social media webpages in order of the social media webpage rankings;

receiving, by one or more processors, an input selecting a link to a particular social media webpage from the multiple social media webpages;

retrieving, by one or more processors, the particular social media webpage from the multiple social media webpages in response to receiving the input selecting the link to the particular social media webpage; and presenting, by one or more processors, the particular social media webpage to a user who selected the link to the particular social media webpage.

2. The computer-implemented method of claim 1, wherein a higher prior webpages quantity leads to a higher social media webpage ranking for a particular social media webpage from the multiple social media webpages, and wherein the higher prior webpages quantity comes from a single navigation path to the particular social media webpage for a single user.

3. The computer-implemented method of claim 1, wherein a higher prior webpages quantity leads to a higher social media webpage ranking for a particular social media webpage from the multiple social media webpages, and wherein the higher prior webpages quantity comes from multiple navigation paths to the particular social media webpage for multiple users.

4. The computer-implemented method of claim 1, wherein a lower subsequent social media webpages quantity leads to a lower social media webpage ranking for a particular social media webpage from the multiple social media webpages.

5. The computer-implemented method of claim 1, further comprising:

assigning, by one or more processors, a lowest available social media webpage ranking to a particular social media webpage from the multiple social media webpages that has a combined social eminence score of all posters of the one or more prior webpages and the one or more subsequent social media webpages that falls below a predefined value.

6. The computer-implemented method of claim 1, further comprising:

assigning a lowest available social media webpage ranking to a particular social media webpage from the multiple social media webpages that has a prior webpages quantity that is below a predefined value.

7. The computer-implemented method of claim 1, further comprising:

assigning, by one or more processors, a lowest available social media webpage ranking to a particular social media webpage from the multiple social media webpages that has a subsequent social media webpages quantity that is below a predefined value.

8. The computer-implemented method of claim 1, wherein the one or more prior webpages were all social media webpages.

9. The computer-implemented method of claim 1, wherein none of the one or more prior webpages were social media webpages.

10. A computer program product for displaying links to multiple social media webpages according to social eminences of respective posters of the multiple social media webpages, the computer program product comprising a non-transitory computer readable storage device having program instructions embodied therewith, the program instructions readable and executable by a computer to computer to perform a method comprising:

receiving, from web interfaces on one or more user computing devices, navigation paths indicating navigation of the web interfaces by one or more viewers of a destination social media webpage on a social media platform, wherein the navigation paths lead to the destination social media webpage, and wherein each navigation path includes:

a navigation pathway through one or more prior webpages that were viewed prior to navigating to the destination social media webpage of the social media platform, the destination social media webpage on the social media platform, and a subsequent navigation pathway after the social media webpage that leads to one or more subsequent social media webpages on the social media platform that were viewed after navigating to the destination social media webpage on the social media platform;

determining a social eminence of each poster of the one or more prior webpages and the one or more subsequent social media webpages;

determining a prior webpages quantity of the one or more prior webpages that were viewed prior to navigating to the destination social media webpage of the social media platform;

determining a subsequent social media webpages quantity of the one or more subsequent social media webpages on the social media platform that were viewed after navigating to the destination social media webpage on the social media platform;

determining a social media webpage ranking of each of multiple social media webpages according to the social eminence of each poster of the one or more prior webpages and the one or more subsequent social media webpages for each of the multiple social media webpages, the prior webpages quantity for each of the multiple social media webpages, and the subsequent social media webpages quantity for each of the multiple social media webpages;

displaying links to the multiple social media webpages in order of the social media webpage rankings;

receiving an input selecting a link to a particular social media webpage from the multiple social media webpages;

retrieving the particular social media webpage from the multiple social media webpages in response to receiving the input selecting the link to the particular social media webpage; and presenting the particular social media webpage to a user who selected the link to the particular social media webpage.

11. The computer program product of claim 10, wherein a higher prior webpages quantity leads to a higher social media webpage ranking for a particular social media webpage from the multiple social media webpages, and wherein the higher prior webpages quantity comes from a single navigation path to the particular social media webpage for a single user.

12. The computer program product of claim 10, wherein a higher prior webpages quantity leads to a higher social media webpage ranking for a particular social media webpage from the multiple social media webpages, and wherein the higher prior webpages quantity comes from multiple navigation paths to the particular social media webpage for multiple users.

13. The computer program product of claim 10, wherein a lower subsequent social media webpages quantity leads to a lower social webpage media ranking for a particular social media webpage from the multiple social media webpages.

14. The computer program product of claim 10, wherein the method further comprises: assigning a lowest available social media webpage ranking to a particular social media webpage from the multiple social media webpages that has a combined social eminence score of all posters of the one or more prior webpages and the one or more subsequent social media webpages that falls below a predefined value.

15. The computer program product of claim 10, wherein the method further comprises: assigning a lowest available social media webpage ranking to a particular social media webpage from the multiple social media webpages that has a prior webpages quantity that is below a predefined value.

16. The computer program product of claim 10, wherein the method further comprises: assigning a lowest available social media webpage ranking to a particular social media webpage from the multiple social media webpages that has a subsequent social media webpages quantity that is below a predefined value.

17. The computer program product of claim 10, wherein the program instructions are provided as a service in a cloud environment.

18. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to receive, from web interfaces on one or more user computing devices, navigation paths indicating navigation of the web interfaces by one or more viewers of a destination social media webpage on a social media platform, wherein the navigation paths lead to the destination social media webpage, and wherein each navigation path includes;

a navigation pathway through one or more prior webpages that were viewed prior to navigating to the destination social media webpage of the social media platform, the destination social media webpage on the social media platform, and a subsequent navigation pathway after the social media webpage that leads to one or more subsequent social media webpages on the social media platform that were viewed after navigating to the destination social media webpage on the social media platform;

program instructions to determine a social eminence of each poster of the one or more prior webpages and the one or more subsequent social media webpages;

program instructions to determine a prior webpages quantity of the one or more prior webpages that were viewed prior to navigating to the destination social media webpage of the social media platform;

program instructions to determine a subsequent social media webpages quantity of the one or more subsequent social media webpages on the social media platform that were viewed after navigating to the destination social media webpage on the social media platform;

program instructions to determine a social media webpage ranking of each of multiple social media webpages according to the social eminence of each poster of the one or more prior webpages and the one or more subsequent social media webpages for each of the multiple social media webpages, the prior webpages quantity for each of the multiple social media webpages, and the subsequent social media webpages quantity for each of the multiple social media webpages;

program instructions to display links to the multiple social media webpages in order of the social media webpage rankings;

program instructions to receive an input selecting a link to a particular social media webpage from the multiple social media webpages;

program instructions to retrieve the particular social media webpage from the multiple social media webpages in response to receiving the input selecting the link to the particular social media webpage; and program instructions to present the particular social media webpage to a user who selected the link to the particular social media webpage.

19. The computer system of claim 18, wherein a higher prior webpages quantity leads to a higher social media webpage ranking for a particular social media webpage from the multiple social media webpages, and wherein the higher prior webpages quantity comes from a single navigation path to the particular social media webpage for a single user.

20. The computer system of claim 18, wherein a higher prior webpages quantity leads to a higher social webpage media ranking for a particular social media webpage from the multiple social media webpages, and wherein the higher prior webpages quantity comes from multiple navigation paths to the particular social media webpage for multiple users.

* * * * *